United States Patent
Shi

(10) Patent No.: US 8,348,168 B2
(45) Date of Patent: Jan. 8, 2013

(54) FOCUS ADJUSTMENT WITH LIQUID CRYSTAL DEVICE IN IMAGING SCANNER

(75) Inventor: David T. Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 194 days.

(21) Appl. No.: 12/780,969

(22) Filed: May 17, 2010

(65) Prior Publication Data

US 2011/0278360 A1    Nov. 17, 2011

(51) Int. Cl.
*G06K 7/10* (2006.01)
*G06K 15/12* (2006.01)

(52) U.S. Cl. .......... 235/462.41; 235/462.11; 235/462.24

(58) Field of Classification Search ............. 235/462.41, 235/462.24, 462.11, 472.01, 462.01
See application file for complete search history.

(56) References Cited

U.S. PATENT DOCUMENTS

| | | | |
|---|---|---|---|
| 4,794,239 A | | 12/1988 | Allais |
| 5,467,204 A | * | 11/1995 | Hatano et al. ................. 358/482 |
| 5,703,349 A | | 12/1997 | Meyerson et al. |
| 5,877,876 A | | 3/1999 | Birdwell |
| 2005/0057701 A1 | * | 3/2005 | Weiss ............................ 349/10 |
| 2005/0122461 A1 | * | 6/2005 | Yamamoto et al. ........... 349/143 |
| 2005/0218231 A1 | | 10/2005 | Massieu |
| 2006/0250543 A1 | * | 11/2006 | Sugimoto et al. ............... 349/62 |
| 2007/0063048 A1 | * | 3/2007 | Havens et al. ........... 235/462.46 |
| 2008/0277480 A1 | | 11/2008 | Thuries et al. |
| 2009/0072037 A1 | | 3/2009 | Good et al. |
| 2009/0166543 A1 | | 7/2009 | Vinogradov |
| 2009/0237575 A1 | | 9/2009 | Tsi-Shi |
| 2010/0108765 A1 | | 5/2010 | Vinogradov |
| 2010/0123007 A1 | | 5/2010 | Wittenberg et al. |

FOREIGN PATENT DOCUMENTS

| | | |
|---|---|---|
| EP | 2009468 | 12/2008 |
| WO | 2009061317 | 5/2009 |

OTHER PUBLICATIONS

International Search Report and Written Opinion dated Feb. 25, 2011 in related case PCT/US2010/062169.

* cited by examiner

*Primary Examiner* — Edwyn Labaze
(74) *Attorney, Agent, or Firm* — Nong-Qiang Fan

(57) ABSTRACT

A method and apparatus for using in an imaging scanner. The apparatus includes an illumination source, a solid-state imager, a liquid crystal device, a lens system, and a decoding circuitry. The liquid crystal device has a liquid crystal material sandwiched between two parallel plate structures. The lens system is operative to focus light reflected from the target object onto the array of photosensitive elements in the solid-state imager through the liquid crystal device. The decoding circuitry is operative to decode a barcode on the target object from the image captured by the solid-state imager.

15 Claims, 4 Drawing Sheets

FOCUS ADJUSTMENT WITH LIQUID CRYSTAL DEVICE IN IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417, which are respectively described in U.S. Pat. Nos. 4,794,239 and 5,304,786.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

The performance of an imaging-based barcode reader for reading and decoding a barcode substantially depends upon the quality of the image of this barcode that is detected by the solid-state imager. The quality of the image depends upon whether the image is correctly focused on the solid-state imager. In many imaging-based barcode readers, actuators are used to move lenses, mirrors, or imaging chips for achieving focused images on the solid-state imager over some extended range of working distances. It may be desirable, however, to have an imaging-based barcode reader that can achieve focused images over some range of working distances without using actuators or any other moving parts.

SUMMARY

In one aspect, the invention is directed to an apparatus that includes an illumination source, a solid-state imager, a liquid crystal device, a lens system, and a decoding circuitry. The illumination source is operative to provide illumination directed toward a target object. The solid-state imager has an array of photosensitive elements for capturing an image from the target object. The liquid crystal device has a liquid crystal material sandwiched between two parallel plate structures. The lens system is operative to focus light reflected from the target object onto the array of photosensitive elements in the solid-state imager through the liquid crystal device. The decoding circuitry is operative to decode a barcode on the target object from the image captured by the solid-state imager.

In another aspect, the invention is directed to a method. The method includes the following steps or blocks: (1) illuminating a barcode on a target object with an illumination source; (2) focusing light reflected from the target object onto an array of photosensitive elements in a solid-state imager through a liquid crystal device with a lens system, wherein the liquid crystal device having a liquid crystal material sandwiched between two parallel plate structures; (3) capturing an image of the barcode with onto the array of photosensitive elements in the solid-state imager; and (4) decoding the barcode on the target object from the image captured by the solid-state imager.

Implementations of the invention can include one or more of the following advantages. When a liquid crystal device is used in combination with a lens system in an imaging scanner, an auto-focus system can be constructed without using actuators or any other moving parts. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
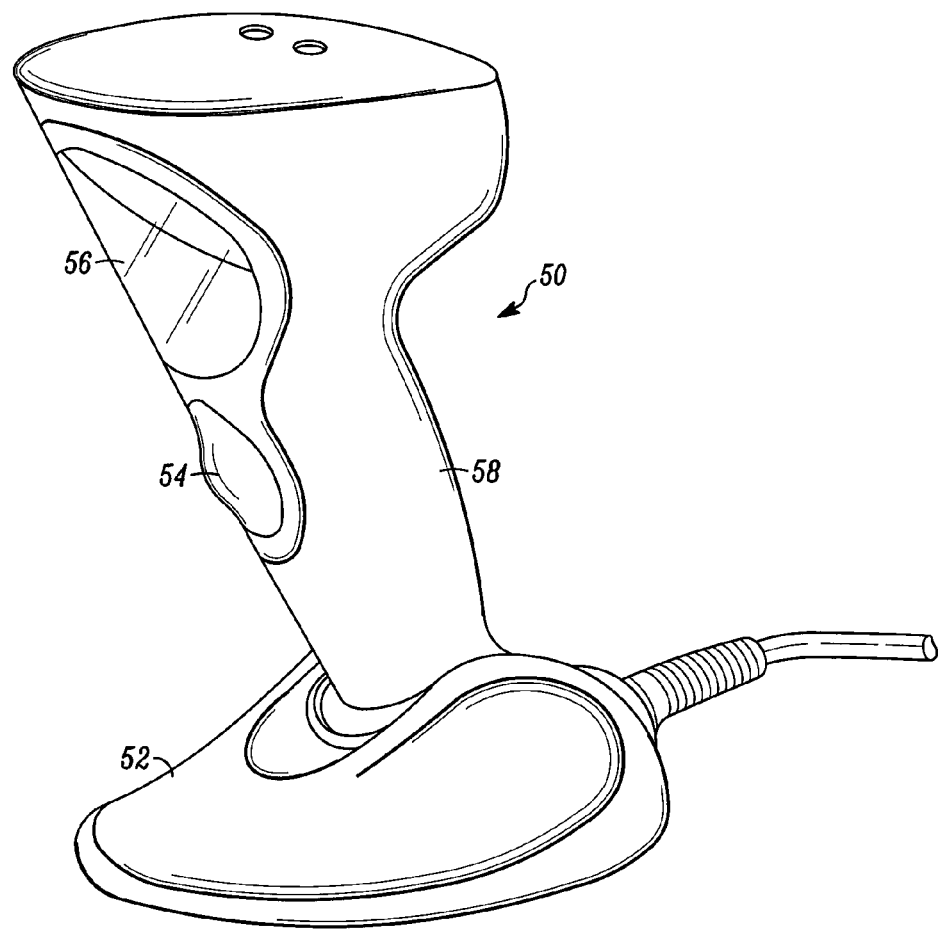
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
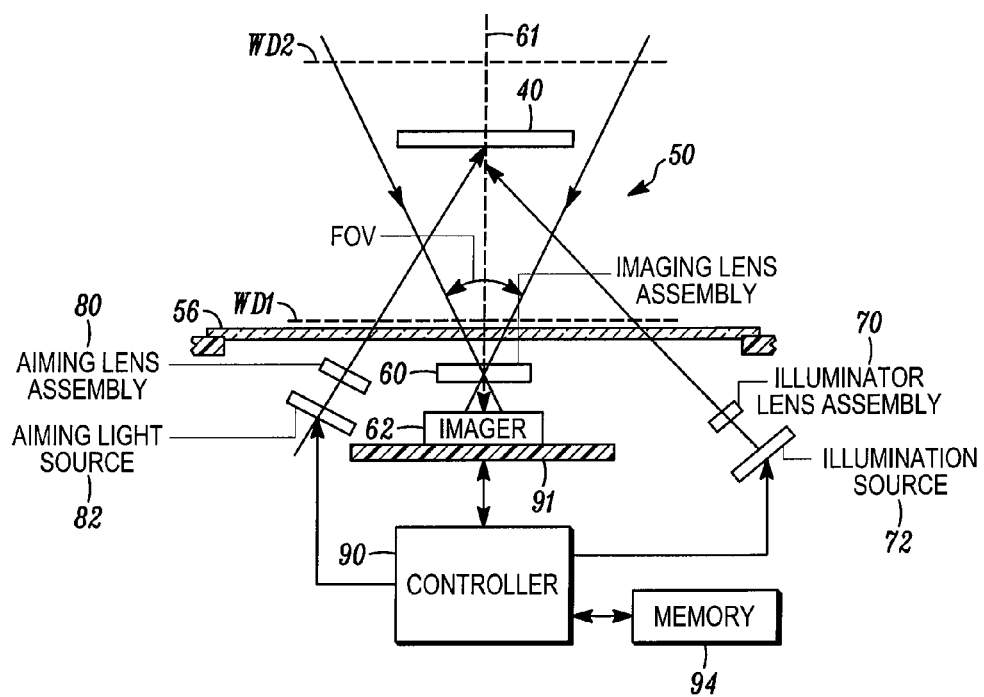
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
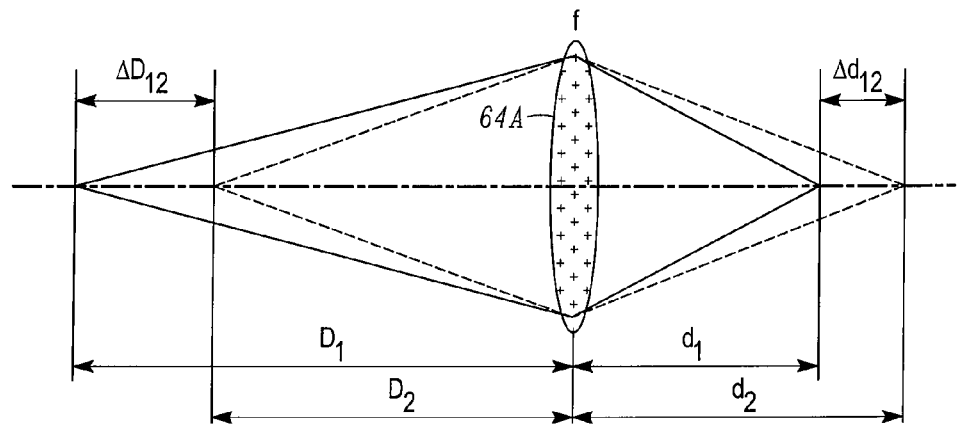
FIG. 3 illustrates how a change in the image focus plane is related to a change in the object focus plane for a lens.

FIG. 3 illustrates how a change in the image focus plane is related to a change in the object focus plane for a lens 64A. In FIG. 3, the lens 64A has a focus length f. As shown in FIG. 3, the lens 64A focuses an object located at a distance $D_1$ from the lens system to an image focus plane located at a distance $d_1$ from the lens system, where the object distance $D_1$ and the image distance $d_1$ are related by the relationship $1/f=1/D_1+1/d_1$. Similarly, the lens 64A focuses an object located at a distance $D_2$ from the lens system to an image focus plane located at a distance $d_2$ from the lens system, where the object distance $D_2$ and the image distance $d_2$ are related by the relationship $1/f=1/D_2+1/d_2$. It follows that $1/D_1-1/D_2=1/d_1-1/d_2$. Therefore, the change in the object distances is related to the change in the image distances by the following equation.

$$\Delta D_{12} = \frac{D_1 D_2}{d_1 d_2} \Delta d_{12} \approx M^2 \Delta d_{12}.$$

That is, the axial shift of the object focus point $\Delta D_{12}$ is closely related to the shift of the image focus point $\Delta d_{12}$ multiplied by the square of corresponding magnification M.

Figure 4:
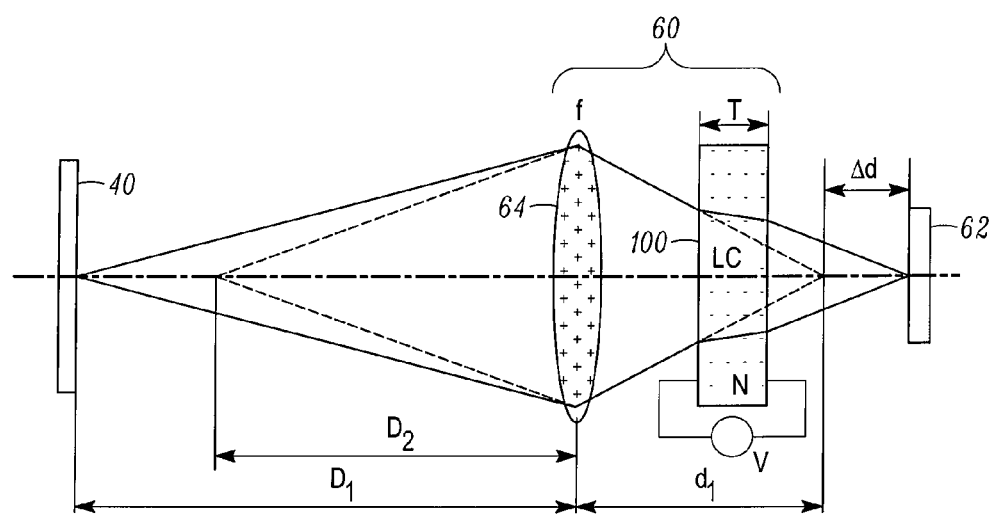
FIG. 4 illustrates an implementation of an imaging lens assembly for using in an imaging scanner in accordance with some embodiments.
Figure 5:
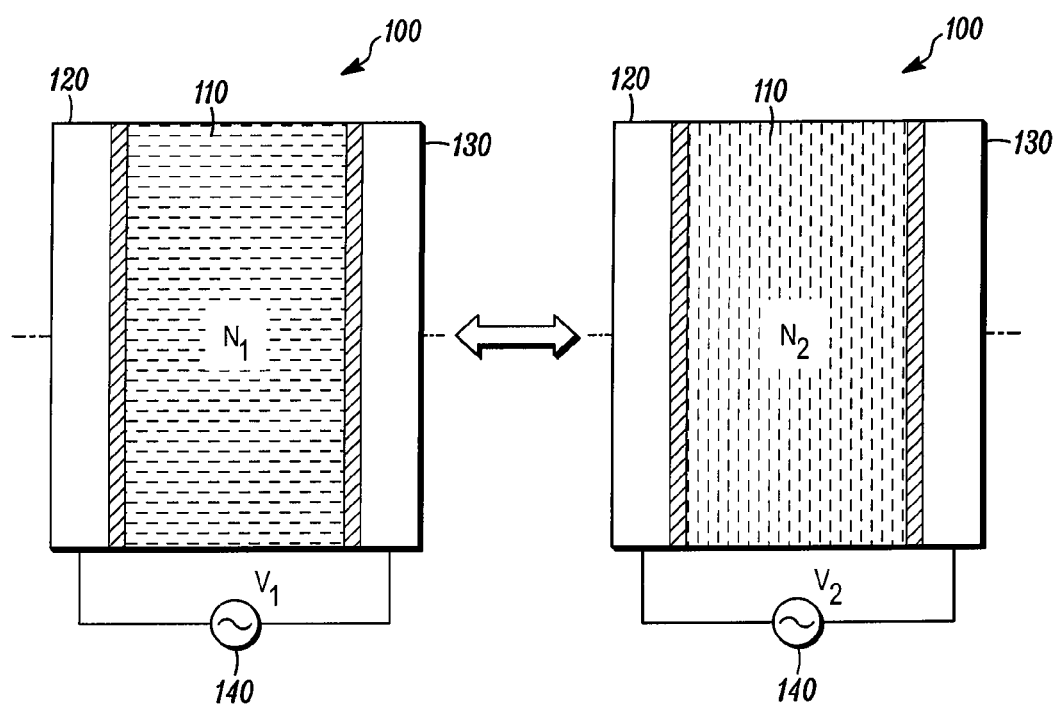
FIG. 5 shows a liquid crystal device that includes a liquid crystal material sandwiched between two parallel plate structures.

FIG. 4 illustrates an implementation of an imaging lens assembly 60 for using in an imaging scanner 50 in accordance with some embodiments. The imaging lens assembly 60 in FIG. 4 includes a lens system 64 and a liquid crystal device 100. FIG. 5 shows the liquid crystal device 100 in more details. In FIG. 5, the liquid crystal device 100 includes a liquid crystal material 110 sandwiched between two parallel plate structures 120 and 130. In one implementation, the two parallel plate structures 120 and 130 are made from glass, plastic, or other transparent materials. A layer of transparent conducting materials, such as ITO (Tin doped Indium oxide), can be coated on each of the two parallel plate structures 120 and 130 to form the electrodes for applying a voltage between the two parallel plate structures 120 and 130.

In FIG. 5, a voltage source 140 is connected to the liquid crystal device 100 for applying a voltage between the two parallel plate structures 120 and 130 to change the refractive index of the liquid crystal material 110. For example, when a first voltage $V_1$ is applied between the two parallel plate structures 120 and 130, the refractive index of liquid crystal material 110 becomes $N_1$; when a second voltage $V_2$ is applied between the two parallel plate structures 120 and 130, the refractive index of liquid crystal material 110 becomes $N_2$.

As shown in FIG. 4, the lens system 64 and the liquid crystal device 100 are positioned in front of the solid-state imager 62. Light from the barcode 40 located at an objective distance $D_1$ from the lens system 64 can be focused on the solid-state imager 62 located at an image distance $d_1$ from the lens system 64. When the liquid crystal device 100 is inserted at a position in the optical path between the lens system 64 and the solid-state imager 62, the focus position of an image of an object, such as the barcode 40, will be shifted. The shift of the image focus point Δd due to the liquid crystal device 100 depends upon the refractive index of the liquid crystal material 110 in the liquid crystal device 100. If the thickness of the liquid crystal material 110 is T and the refractive index of the liquid crystal material 110 is N, the shift of the image focus point Δd(N) due to the liquid crystal material 110 with refractive index N is given by equation, $\Delta d(N)=T*(N-1)/N$. Therefore, if the refractive index of the liquid crystal material 110 is $N_1$, the shift of the image focus point is $\Delta d(N_1)=T*(N_1-1)/N_1$, and if the refractive index of the liquid crystal material 110 is $N_2$, the shift of the image focus point is $\Delta d(N_2)=T*(N_2-1)/N_2$.

When the refractive index of the liquid crystal material is changed from $N_1$ to $N_2$, the image focus point is changed by an amount $\Delta d_{12}=\Delta d(N_2)-\Delta d(N_1)=T*(N_2-N_1)/N_1 N_2$. This change of the image focus point $\Delta d_{12}$ can be estimated approximately by equation $\Delta d_{12} \approx (\Delta N/N)*(T/N)$, where N is the average refractive index and ΔN/N is the relative change of the refractive index. This change of the image focus point $\Delta d_{12}$ results in a corresponding change of the object focus plane $$\Delta D_{12} \approx M^2 \Delta d_{12} \approx \frac{\Delta N}{N} * \frac{T}{N} * M^2.$$

In an example where T=1 mm, ΔN/N=25%, N=1.3, and M=25, the change of the focus plane for the object to be imaged is $\Delta D_{12} \approx 120$ mm, which is about 4.7 inches. Therefore, some changes of the refractive index of the liquid crystal material 110 caused by the voltage applied between the two parallel plate structures 120 and 130 in liquid crystal device 100 can cause significant shift of the focus plane for the object to be imaged.

With the liquid crystal device 100 in combination with the lens system 64, it is possible to construct an auto-focus system for the imaging scanner 50 without using actuators or any other moving parts. The object focus plane of the imaging scanner 50 can be shifted by simply adjusting the voltage applied to the liquid crystal device 100, to focusing the image of a barcode more clearly on the solid-state imager 62. In addition, the image quality of a barcode that is within the auto-focus working range will not be very sensitive to the mechanical position and angular tolerance for the liquid crystal device 100, because of the nature of the two parallel plate structures. It means that the liquid crystal device 100 can be more easily assembled into the imaging scanner 50 during manufacturing.

There are also other advantageous of using the liquid crystal device 100 in an auto-focus system for the imaging scanner 50. For example, because the liquid crystal device 100 device is located between lens system 64 and the solid-state imager 62, it can be well shielded from outside world and closed inside the chassis chamber of the imaging scanner 50. Furthermore, if the auto-focus function is not needed, the liquid crystal device 100 device can be easily removed from the imaging scanner 50, so the imaging lens assembly 60 can become a system with a fixed focus.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    an illumination source for providing illumination directed toward a target object;
    a solid-state imager having an array of photosensitive elements for capturing an image from the target object;
    a liquid crystal device having a liquid crystal material sandwiched between two parallel plate structures;
    a lens system operative to focus light reflected from the target object onto the array of photosensitive elements in the solid-state imager through a uniform layer of the liquid crystal material between a section of the two parallel plate structures in the liquid crystal device, wherein the liquid crystal device is positioned between the lens system and the solid-state imager; and
    a decoding circuitry operative to decode a barcode on the target object from the image captured by the solid-state imager.

2. The apparatus of claim 1, wherein the lens system includes a simple lens.

3. The apparatus of claim 1, wherein the lens system includes a compound lens.

4. The apparatus of claim 1, wherein the two parallel plate structures form two transparent electrodes.

5. The apparatus of claim 1, wherein the two parallel plate structures form two electrodes that are transparent at a wavelength of the illumination generated from the illumination source.

6. The apparatus of claim 1, further comprising:
    an electric circuitry for applying a voltage between the two parallel plate structures.

7. An apparatus for using in a barcode reader comprising:
    a solid-state imager having an array of photosensitive elements for capturing an image from a target object having a barcode;
    a liquid crystal device having a liquid crystal material sandwiched between two parallel plate structures;
    a lens system operative to focus light reflected from the target object onto the array of photosensitive elements in the solid-state imager through a uniform layer of the liquid crystal material between a section of the two parallel plate structures in the liquid crystal device, wherein the liquid crystal device is positioned between the lens system and the solid-state imager; and
    an electric circuitry operative to transfer the image captured by the solid-state imager to a decoding circuitry of the barcode reader.

8. The apparatus of claim 7, further comprising:
    an electric circuitry for applying a voltage between the two parallel plate structures.

9. A method of using a liquid crystal device in a barcode reader, the liquid crystal device having a liquid crystal material sandwiched between two parallel plate structures, comprising:
    illuminating a barcode on a target object with an illumination source;
    focusing light reflected from the target object onto an array of photosensitive elements in a solid-state imager through a uniform layer of the liquid crystal material between a section of the two parallel plate structures in a liquid crystal device with a lens system, wherein the liquid crystal device is positioned between the lens system and the solid-state imager;
    capturing an image of the barcode with onto the array of photosensitive elements in the solid-state imager; and
    decoding the barcode on the target object from the image captured by the solid-state imager.

10. The method of claim 9, wherein the lens system includes a simple lens.

11. The method of claim 9, wherein the lens system includes a compound lens.

12. The method of claim 9, further comprising
    configuring the two parallel plate structures to function as two electrodes.

13. The method of claim 9, further comprising:
    applying a voltage between the two parallel plate structures.

14. The method of claim 9, wherein the focusing comprises:
    focusing light reflected from the target object onto the array of photosensitive elements in the solid-state imager through the liquid crystal material.

15. The method of claim 9, wherein the focusing comprises:
    focusing light reflected from the target object onto the array of photosensitive elements in the solid-state imager through the liquid crystal material and through the two parallel plate structures.

* * * * *